US009520155B2

(12) United States Patent
Bloch et al.

(10) Patent No.: US 9,520,155 B2
(45) Date of Patent: Dec. 13, 2016

(54) METHODS AND SYSTEMS FOR SEEKING TO NON-KEY FRAMES

(71) Applicant: JBF Interlude 2009 LTD—Israel, Tel Aviv-Jaffa (IL)

(72) Inventors: Jonathan Bloch, Brooklyn, NY (US); Barak Feldman, Tenafly, NJ (US); Tal Zubalsky, Tel Aviv-Jaffa (IL); Yuval Hofshy, Kfar Saba (IL); Tomer Lahav, Brooklyn, NY (US)

(73) Assignee: JBF Interlude 2009 LTD (IL)

( * ) Notice: Subject to any disclaimer, the term of this patent is extended or adjusted under 35 U.S.C. 154(b) by 67 days.

(21) Appl. No.: 14/140,007

(22) Filed: Dec. 24, 2013

(65) Prior Publication Data

US 2015/0179224 A1   Jun. 25, 2015

(51) Int. Cl.
| | |
|---|---|
| H04N 5/783 | (2006.01) |
| G11B 27/10 | (2006.01) |
| H04N 19/107 | (2014.01) |
| H04N 21/6587 | (2011.01) |
| H04N 21/2387 | (2011.01) |
| H04N 9/804 | (2006.01) |
| H04N 7/173 | (2011.01) |
| H04N 21/2343 | (2011.01) |
| H04N 5/76 | (2006.01) |
| H04N 5/93 | (2006.01) |

(52) U.S. Cl.
CPC ............... *G11B 27/105* (2013.01); *H04N 5/76* (2013.01); *H04N 5/93* (2013.01); *H04N 7/17336* (2013.01); *H04N 9/8042* (2013.01); *H04N 19/107* (2014.11); *H04N 21/2387* (2013.01); *H04N 21/234381* (2013.01); *H04N 21/6587* (2013.01)

(58) Field of Classification Search
USPC .......................................... 386/241
See application file for complete search history.

(56) References Cited

U.S. PATENT DOCUMENTS

| | | | |
|---|---|---|---|
| 5,568,602 | A | 10/1996 | Callahan et al. |
| 5,607,356 | A | 3/1997 | Schwartz |
| 5,636,036 | A | 6/1997 | Ashbey |
| 5,734,862 | A | 3/1998 | Kulas |

(Continued)

FOREIGN PATENT DOCUMENTS

| | | |
|---|---|---|
| DE | 10053720 A1 | 4/2002 |
| EP | 1033157 A2 | 9/2000 |

(Continued)

OTHER PUBLICATIONS

An ffmpeg and SDL Tutorial, "Tutorial 05: Synching Video," Retrieved from internet on Mar. 15, 2013: <http://dranger.com/ffmpeg/tutorial05.html>, (4 pages).

(Continued)

*Primary Examiner* — Helen Shibru
(74) *Attorney, Agent, or Firm* — Goodwin Procter LLP (57) ABSTRACT

Methods and systems for seeking to a non-key frame in a compressed video. The compressed video has a plurality of frames, each with a playback timestamp. At least one of the frames is a key frame. A selection of a non-key frame is received, and a temporally proximate key frame is identified. The set of frames between the identified key frame and the selected frame is played in a reduced time interval, and the selected frame is displayed as if it were a key frame.

20 Claims, 3 Drawing Sheets

(56) References Cited

U.S. PATENT DOCUMENTS

| | | | |
|---|---|---|---|
| 5,818,435 A | 10/1998 | Kozuka et al. | |
| 5,887,110 A * | 3/1999 | Sakamoto | H04N 5/783 348/E5.008 |
| 6,122,668 A | 9/2000 | Teng et al. | |
| 6,128,712 A | 10/2000 | Hunt et al. | |
| 6,191,780 B1 | 2/2001 | Martin et al. | |
| 6,222,925 B1 | 4/2001 | Shiels et al. | |
| 6,298,482 B1 | 10/2001 | Seidman et al. | |
| 6,728,477 B1 | 4/2004 | Watkins | |
| 6,801,947 B1 | 10/2004 | Li | |
| 7,155,676 B2 | 12/2006 | Land et al. | |
| 7,231,132 B1 * | 6/2007 | Davenport | H04N 5/783 348/E5.008 |
| 7,310,784 B1 | 12/2007 | Gottlieb et al. | |
| 7,379,653 B2 | 5/2008 | Yap et al. | |
| 7,444,069 B1 | 10/2008 | Bernsley | |
| 7,627,605 B1 | 12/2009 | Lamere et al. | |
| 7,917,505 B2 | 3/2011 | van Gent et al. | |
| 8,065,710 B2 | 11/2011 | Malik | |
| 8,190,001 B2 | 5/2012 | Bernsley | |
| 8,276,058 B2 | 9/2012 | Gottlieb et al. | |
| 8,281,355 B1 | 10/2012 | Weaver et al. | |
| 8,600,220 B2 | 12/2013 | Bloch et al. | |
| 8,650,489 B1 | 2/2014 | Baum et al. | |
| 8,860,882 B2 | 10/2014 | Bloch et al. | |
| 8,977,113 B1 | 3/2015 | Rumteen et al. | |
| 9,009,619 B2 | 4/2015 | Bloch et al. | |
| 9,021,537 B2 | 4/2015 | Funge et al. | |
| 9,190,110 B2 | 11/2015 | Bloch | |
| 9,257,148 B2 | 2/2016 | Bloch | |
| 9,271,015 B2 | 2/2016 | Bloch | |
| 2002/0091455 A1 | 7/2002 | Williams | |
| 2002/0105535 A1 | 8/2002 | Wallace et al. | |
| 2002/0106191 A1 | 8/2002 | Betz et al. | |
| 2002/0120456 A1 | 8/2002 | Berg et al. | |
| 2002/0177914 A1 | 11/2002 | Chase | |
| 2003/0159566 A1 | 8/2003 | Sater et al. | |
| 2003/0183064 A1 | 10/2003 | Eugene et al. | |
| 2003/0184598 A1 | 10/2003 | Graham | |
| 2003/0221541 A1 | 12/2003 | Platt | |
| 2004/0138948 A1 | 7/2004 | Loomis | |
| 2004/0172476 A1 | 9/2004 | Chapweske | |
| 2005/0019015 A1 | 1/2005 | Ackley et al. | |
| 2005/0055377 A1 | 3/2005 | Dorey et al. | |
| 2005/0091597 A1 | 4/2005 | Ackley | |
| 2005/0102707 A1 | 5/2005 | Schnitman | |
| 2006/0028951 A1 | 2/2006 | Tozun et al. | |
| 2006/0064733 A1 | 3/2006 | Norton et al. | |
| 2006/0150072 A1 | 7/2006 | Salvucci | |
| 2006/0155400 A1 | 7/2006 | Loomis | |
| 2006/0200842 A1 | 9/2006 | Chapman et al. | |
| 2006/0224260 A1 | 10/2006 | Hicken et al. | |
| 2007/0003149 A1 * | 1/2007 | Nagumo | H04N 5/783 382/233 |
| 2007/0024706 A1 | 2/2007 | Brannon et al. | |
| 2007/0033633 A1 | 2/2007 | Andrews et al. | |
| 2007/0118801 A1 | 5/2007 | Harshbarger et al. | |
| 2007/0157261 A1 | 7/2007 | Steelberg et al. | |
| 2007/0162395 A1 | 7/2007 | Ben-Yaacov et al. | |
| 2007/0239754 A1 | 10/2007 | Schnitman | |
| 2007/0263722 A1 * | 11/2007 | Fukuzawa | H04N 19/159 375/240.12 |
| 2008/0019445 A1 * | 1/2008 | Aono | H04N 5/783 375/240.12 |
| 2008/0021874 A1 | 1/2008 | Dahl et al. | |
| 2008/0022320 A1 | 1/2008 | Ver Steeg | |
| 2008/0031595 A1 | 2/2008 | Cho | |
| 2008/0086754 A1 | 4/2008 | Chen et al. | |
| 2008/0091721 A1 | 4/2008 | Harboe et al. | |
| 2008/0092159 A1 | 4/2008 | Dmitriev et al. | |
| 2008/0148152 A1 | 6/2008 | Blinnikka et al. | |
| 2008/0170687 A1 * | 7/2008 | Moors | H04N 7/165 380/200 |
| 2008/0276157 A1 | 11/2008 | Kustka et al. | |
| 2008/0300967 A1 | 12/2008 | Buckley et al. | |
| 2008/0301750 A1 | 12/2008 | Silfvast et al. | |
| 2008/0314232 A1 | 12/2008 | Hansson et al. | |
| 2009/0022015 A1 | 1/2009 | Harrison | |
| 2009/0024923 A1 | 1/2009 | Hartwig et al. | |
| 2009/0055880 A1 | 2/2009 | Batteram et al. | |
| 2009/0063681 A1 | 3/2009 | Ramakrishnan et al. | |
| 2009/0116817 A1 | 5/2009 | Kim et al. | |
| 2009/0199697 A1 | 8/2009 | Lehtiniemi et al. | |
| 2009/0228572 A1 | 9/2009 | Wall et al. | |
| 2009/0320075 A1 | 12/2009 | Marko | |
| 2010/0017820 A1 | 1/2010 | Thevathasan et al. | |
| 2010/0042496 A1 | 2/2010 | Wang et al. | |
| 2010/0077290 A1 | 3/2010 | Pueyo | |
| 2010/0146145 A1 * | 6/2010 | Tippin | H04N 21/23424 709/236 |
| 2010/0153512 A1 | 6/2010 | Balassanian et al. | |
| 2010/0161792 A1 | 6/2010 | Palm et al. | |
| 2010/0167816 A1 | 7/2010 | Perlman et al. | |
| 2010/0186579 A1 | 7/2010 | Schnitman | |
| 2010/0262336 A1 | 10/2010 | Rivas et al. | |
| 2010/0268361 A1 | 10/2010 | Mantel et al. | |
| 2010/0278509 A1 | 11/2010 | Nagano et al. | |
| 2010/0287033 A1 | 11/2010 | Mathur | |
| 2010/0287475 A1 | 11/2010 | van Zwol et al. | |
| 2010/0293455 A1 | 11/2010 | Bloch | |
| 2010/0332404 A1 | 12/2010 | Valin | |
| 2011/0007797 A1 | 1/2011 | Palmer et al. | |
| 2011/0010742 A1 | 1/2011 | White | |
| 2011/0026898 A1 | 2/2011 | Lussier et al. | |
| 2011/0096225 A1 | 4/2011 | Candelore | |
| 2011/0126106 A1 | 5/2011 | Ben Shaul et al. | |
| 2011/0131493 A1 | 6/2011 | Dahl | |
| 2011/0138331 A1 | 6/2011 | Pugsley et al. | |
| 2011/0191684 A1 | 8/2011 | Greenberg | |
| 2011/0197131 A1 | 8/2011 | Duffin et al. | |
| 2011/0200116 A1 | 8/2011 | Bloch et al. | |
| 2011/0202562 A1 | 8/2011 | Bloch et al. | |
| 2011/0246885 A1 | 10/2011 | Pantos et al. | |
| 2011/0252320 A1 | 10/2011 | Arrasvuori et al. | |
| 2011/0264755 A1 | 10/2011 | Salvatore De Villiers | |
| 2012/0005287 A1 | 1/2012 | Gadel et al. | |
| 2012/0094768 A1 | 4/2012 | McCaddon et al. | |
| 2012/0110620 A1 | 5/2012 | Kilar et al. | |
| 2012/0134646 A1 * | 5/2012 | Alexander | G11B 27/005 386/241 |
| 2012/0198412 A1 | 8/2012 | Creighton et al. | |
| 2012/0308206 A1 | 12/2012 | Kulas | |
| 2013/0046847 A1 | 2/2013 | Zavesky et al. | |
| 2013/0054728 A1 | 2/2013 | Amir et al. | |
| 2013/0055321 A1 | 2/2013 | Cline et al. | |
| 2013/0259442 A1 | 10/2013 | Bloch et al. | |
| 2013/0282917 A1 | 10/2013 | Reznik et al. | |
| 2013/0308926 A1 * | 11/2013 | Jang | H04N 5/783 386/344 |
| 2014/0040280 A1 | 2/2014 | Slaney et al. | |
| 2014/0078397 A1 | 3/2014 | Bloch et al. | |
| 2014/0082666 A1 | 3/2014 | Bloch et al. | |
| 2014/0129618 A1 | 5/2014 | Panje et al. | |
| 2014/0178051 A1 | 6/2014 | Bloch et al. | |
| 2014/0270680 A1 | 9/2014 | Bloch et al. | |
| 2014/0282013 A1 | 9/2014 | Amijee | |
| 2014/0380167 A1 | 12/2014 | Bloch et al. | |
| 2015/0067723 A1 | 3/2015 | Bloch et al. | |
| 2015/0104155 A1 | 4/2015 | Bloch et al. | |
| 2015/0179224 A1 | 6/2015 | Bloch et al. | |
| 2015/0181301 A1 | 6/2015 | Bloch et al. | |
| 2015/0199116 A1 | 7/2015 | Bloch et al. | |
| 2015/0293675 A1 | 10/2015 | Bloch et al. | |
| 2015/0294685 A1 | 10/2015 | Bloch et al. | |

FOREIGN PATENT DOCUMENTS

| | | |
|---|---|---|
| EP | 2104105 A1 | 9/2009 |
| GB | 2359916 A | 9/2001 |
| GB | 2428329 A | 1/2007 |
| JP | 2008005288 A | 1/2008 |
| WO | WO-00/59224 A1 | 10/2000 |
| WO | WO-2007/062223 A2 | 5/2007 |

(56) References Cited

FOREIGN PATENT DOCUMENTS

| WO | WO-2007/138546 A2 | 12/2007 |
|----|-------------------|---------|
| WO | WO-2008/001350 A2 | 1/2008  |
| WO | WO-2008/052009 A2 | 5/2008  |
| WO | WO-2008/057444 A2 | 5/2008  |
| WO | WO-2009/137919 A1 | 11/2009 |

OTHER PUBLICATIONS

Archos Gen 5 English User Manual Version 3.0, Jul. 26, 2007, pp. 1-81.
Barlett, Mitch, "iTunes 11: How to Queue Next Song," Technipages, Oct. 6, 2008, pp. 1-8, retrieved on Dec. 26, 2013 from the internet http://www.technipages.com/itunes-gueue-next-song.html.
Gregor Miller et al. "MiniDiver: A Novel Mobile Media Playback Interface for Rich Video Content on an iPhoneTM", Entertainment Computing A ICEC 2009, Sep. 3, 2009, pp. 98-109.
International Search Report for International Patent Application PCT/IL2012/000080 dated Aug. 9, 2012 (4 pages).
International Search Report for International Patent Application PCT/IL2012/000081 dated Jun. 28, 2012 (4 pages).
International Search Report for International Patent Application PCT/IL2010/000362 dated Aug. 25, 2010 (2 pages).
International Search Report and Written Opinion for International Patent Application PCT/IB2013/001000 mailed Jul. 31, 2013 (12 pages).
Labs.byHook: "Ogg Vorbis Encoder for Flash: Alchemy Series Part 1," [Online] Internet Article, Retrieved on Jun. 14, 2012 from the Internet: URL:http://labs.byhook.com/2011/02/15/ogg-vorbis-encoder-for-flash-alchemy-series-part-1/, 2011, pp. 1-8.
Sodagar, I., (2011) "The MPEG-DASH Standard for Multimedia Streaming Over the Internet", IEEE Multimedia, IEEE Service Center, New York, NY US, vol. 18, No. 4, pp. 62-67.
Supplemental European Search Report for EP10774637.2 (PCT/IL2010/000362) mailed Jun. 20, 2012 (6 pages).
Supplemental European Search Report for EP13184145 dated Jan. 30, 2014 (6 pages).
Yang, H, et al., "Time Stamp Synchronization in Video Systems," Teletronics Technology Corporation, <http://www.ttcdas.com/products/daus_encoders/pdf/_tech_papers/tp_2010_time_stamp_video_system.pdf>, Abstract, (8 pages).
U.S. Appl. No. 14/884,285, System and Method for Assembling a Recorded Composition, filed Oct. 15, 2015.
U.S. Appl. No. 14/984,821, System and Method for Synchronization of Selectably Presentable Media Streams, filed Dec. 30, 2015.
U.S. Appl. No. 14/509,700, Systems and Methods for Dynamic Video Bookmarking, filed Oct. 8, 2014.
U.S. Appl. No. 14/534,626, Systems and Methods for Parallel Track Transitions, filed Nov. 6, 2014.
U.S. Appl. No. 14/700,845, Systems and Methods for Nonlinear Video Playback Using Linear Real-Time Video Players, filed Apr. 30, 2015.
U.S. Appl. No. 14/700,862, Systems and Methods for Seamless Media Creation, Apr. 30, 2015.
U.S. Appl. No. 14/835,857, Systems and Methods for Adaptive and Responsive Video, filed Aug. 26, 2015.
U.S. Appl. No. 14/978,464, Intelligent Buffering of Large-Scale Video, filed Dec. 22, 2015.
U.S. Appl. No. 14/978,491, Seamless Transitions in Large-Schale Vidoe, filed Dec. 22, 2015.
U.S. Appl. No. 15/085,209, Media Stream Rate Synchronization, Mar. 30, 2016.
U.S. Appl. No. 12/706,721, now U.S. Pat. No. 9,190,110, the Office Actions mailed Apr. 26, 2012, Aug. 17, 2012, Mar. 28, 2013, Jun. 20, 2013, Jan. 3, 2014, Jul. 7, 2014, and Dec. 19, 2014; the Notices of Allowance mailed Jun. 19, 2015 and Jul. 17, 2015; the Notices of Allowability mailed Jul. 29, 2015, Aug. 12, 2015 and Sep. 14, 2015.
U.S. Appl. No. 13/033,916, the Office Actions mailed Jun. 6, 2013, Jan. 2, 2014, Aug. 28, 2014, Jan. 5, 2015, Jul. 9, 2015, and Jan. 5, 2016.
U.S. Appl. No. 13/034,645, the Office Actions mailed Jul. 23, 2012, Mar. 21, 2013, Sep. 15, 2014, and Jun. 4, 2015.
U.S. Appl. No. 13/437,164, now U.S. Pat. No. 8,600,220, the Notice of Allowance mailed Aug. 9, 2013.
U.S. Appl. No. 14/069,694, now U.S. Pat. No. 9,271,015, the Office Actions mailed Apr. 27, 2015 and Aug. 31, 2015, the Notice of Allowance mailed Oct. 13, 2015.
U.S. Appl. No. 13/622,780, now U.S. Pat. No. 8,860,882, the Office Action mailed Jan. 16, 2014, the Notice of Allowance mailed Aug. 4, 2014.
U.S. Appl. No. 13/622,795, now U.S. Pat. No. 9,009,619, the Office Actions mailed May 23, 2014 and Dec. 1, 2014, the Notice of Allowance mailed Jan. 9, 2015.
U.S. Appl. No. 13/838,830, now U.S. Pat. No. 9,257,148, the Office Action mailed May 7, 2015, the Notice of Allowance mailed Nov. 6, 2015.
U.S. Appl. No. 13/921,536, the Office Actions mailed Feb. 25, 2015 and Oct. 20, 2015.
U.S. Appl. No. 14/107,600, the Office Actions mailed Dec. 19, 2014 and Jul. 8, 2015.
U.S. Appl. No. 14/335,381, the Office Action mailed Feb. 12, 2016.
U.S. Appl. No. 14/139,996, the Office Action mailed Jun. 18, 2015 and Feb. 3, 2016.
U.S. Appl. No. 14/249,627, the Office Action mailed Jun. 14, 2016; and.
U.S. Appl. No. 14/534,626, the Office Action mailed Nov. 25, 2015.
U.S. Appl. No. 14/249,665, Published as Dynamic Timeline for Branched Video, filed Apr. 10, 2014.
U.S. Appl. No. 14/700,862, Systems and Methods for Seamless Media Creation, filed Apr. 30, 2015.
U.S. Appl. No. 12/706,721, the Office Actions mailed Apr. 26, 2012, Aug. 17, 2012, Mar. 28, 2013, Jun. 20, 2013, Jan. 3, 2014, Jul. 7, 2014, and Dec. 19, 2014; the Notices of Allowance mailed Jun. 19, 2015 and Jul. 17, 2015; the Notices of Allowability mailed Jul. 29, 2015, Aug. 12, 2015 and Sep. 14, 2015.
U.S. Appl. No. 13/033,916, the Office Actions mailed Jun. 7, 2013, Jan. 2, 2014, Aug. 28, 2014, Jan. 5, 2015, and Jul. 9, 2015.
U.S. Appl. No. 14/069,694, the Office Actions mailed Apr. 27, 2015 and Aug. 31, 2015, the Notice of Allowance mailed Oct. 13, 2015.
U.S. Appl. No. 13/838,830, the Office Action mailed May 7, 2015, the Notice of Allowance mailed Nov. 6, 2015.
U.S. Appl. No. 13/921,536, the Office Actions mailed Feb. 25, 2015 and Oct. 20, 2015; and.
U.S. Appl. No. 14/139,996, the Office Action mailed Jun. 18, 2015.

\* cited by examiner

METHODS AND SYSTEMS FOR SEEKING TO NON-KEY FRAMES

FIELD OF THE INVENTION

The present disclosure relates generally to video playback and editing, and more particularly to methods and systems for seeking to a non-key frame within a compressed video.

BACKGROUND

In video compression, a key frame, also known as an intra-frame (I-frame), is a frame in which a complete image is stored in the data stream. In video compression, only changes that occur between frames are stored in the data stream in order to greatly reduce the amount of information that must be stored. This technique capitalizes on the fact that most video sources (such as a typical movie) have only small changes in the image from one frame to the next. However, whenever a drastic change to the image occurs, such as when switching from one camera shot to another, or at a scene change, a key frame is created. The entire image for the frame is stored as a key frame when the visual difference between the two frames is so great that representing the new image incrementally from the previous frame would be more complex and would require even more bits than reproducing the whole image.

Because video compression only stores incremental changes between frames (except for key frames), it is not possible to fast forward or rewind to any arbitrary spot in the video stream without the decoder having access to the key frame. This is because the data for a given frame may represent only how that frame differs from the preceding frame. For that reason it is beneficial to include key frames at arbitrary intervals while encoding video. For example, a key frame may be output once for every ten seconds of video, even though the video image does not change enough visually to warrant the automatic creation of the key frame. This allows seeking within the video stream at a minimum of ten second intervals. The downside to this approach is that the resulting video stream is larger in size because many key frames exist that are not necessary for the visual representation of the frame during normal playback. Further, a user cannot seek to an arbitrary frame in the video and see a complete image if the frame is not a key frame. What is needed, then, are techniques to access complete image frames at locations in a video other than key frames.

SUMMARY

Various implementations of methods and systems for seeking to and displaying non-key frame video frames in compressed video are provided.

In one aspect, a computer-implemented includes providing a compressed video having a plurality of frames. Each frame has a playback timestamp, and at least one of the frames is a key frame. A selection of a non-key frame is received, and a key frame in the compressed video that is temporally proximate to the selected frame is identified. A set of frames between the identified key frame and the selected frame is played in a reduced time interval, and the selected frame is displayed as if it were a key frame.

In one implementation, the temporally proximate key frame is identified by locating a key frame that is nearest to and temporally precedes the selected frame.

In another implementation, playing the set of frames includes, for at least one of the frames in the set, decreasing the value of the playback timestamp of that frame. The timestamp value for the particular frame can be set substantially equal to zero, and all of the frame timestamps in the set of frames can be set substantially equal to zero. The value of the playback timestamp of the selected frame can be decreased as well, and can be set substantially equal to zero. The playback timestamp of at least one of the frames following the selected frame can be set to a value greater than the playback timestamp of the selected frame.

In yet another implementation, the selected frame is displayed as if it were a key frame by displaying the selected frame as a complete image. A command to pause the video can be inserted after the selected frame.

In another aspect, a system includes one or more computers programmed to perform operations including providing a compressed video having a plurality of frames, each frame having a playback timestamp, and at least one of the frames is a key frame. A selection of one of the frames that is not a key frame is received, and a key frame in the compressed video that is temporally proximate to the selected frame is identified. The set of frames between the identified key frame and the selected frame is played in a reduced time interval, and the selected frame is displayed as if it were a key frame.

In one implementation, the temporally proximate key frame is identified by locating a key frame that is nearest to and temporally precedes the selected frame.

In another implementation, playing the set of frames includes, for at least one of the frames in the set, decreasing the value of the playback timestamp of that frame. The timestamp value for the particular frame can be set substantially equal to zero, and all of the frame timestamps in the set of frames can be set substantially equal to zero. The value of the playback timestamp of the selected frame can be decreased as well, and can be set substantially equal to zero. The playback timestamp of at least one of the frames following the selected frame can be set to a value greater than the playback timestamp of the selected frame.

In yet another implementation, the selected frame is displayed as if it were a key frame by displaying the selected frame as a complete image. A command to pause the video can be inserted after the selected frame.

Other aspects and advantages of the invention will become apparent from the following drawings, detailed description, and claims, all of which illustrate the principles of the invention, by way of example only.

BRIEF DESCRIPTION OF THE DRAWINGS

A more complete appreciation of the invention and many attendant advantages thereof will be readily obtained as the same becomes better understood by reference to the following detailed description when considered in connection with the accompanying drawings. In the drawings, like reference characters generally refer to the same parts throughout the different views. Further, the drawings are not necessarily to scale, with emphasis instead generally being placed upon illustrating the principles of the invention.

DETAILED DESCRIPTION

Described herein are various implementations of methods and supporting systems for frame-by-frame seeking and displaying of non-key frame video frames in progressive-downloaded or compressed video. In viewing or editing compressed video, it is often desirable or necessary to view each frame (or a single frame) as a complete image. However, because conventional video compression techniques store only differences between frames for the majority of frames, users are limited to seeking to key frames if they want to view complete images. Although uncompressed video stores complete image frames and all frames can be viewed and edited using, for example, desktop software, this is not a practical approach when viewing or editing video over the Internet due to the large file size of videos, device processing limitations (e.g., smartphones), as well as bandwidth limitations.

Figure 1A:
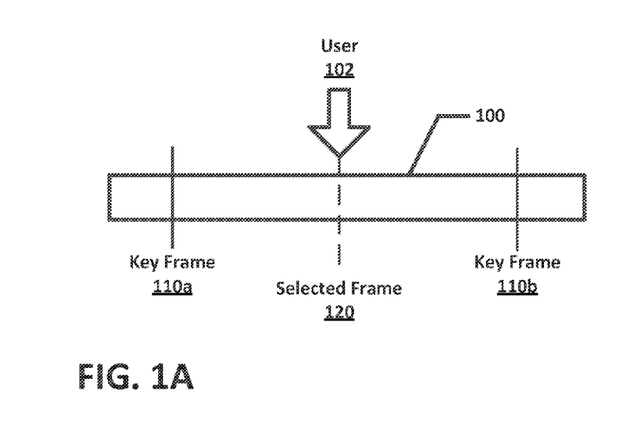
FIGS. 1A-1D are example diagrams of a non-key frame seeking process.

FIGS. 1A-1D illustrate one implementation of a technique for seeking to a non-key frame in a compressed video using, for example, a video player or video editor. In FIG. 1A, a portion of an example compressed video 100 includes key frames (or I-frames) 110a and 110b. Between the key frames 110a and 110b is one or more non-key frames (e.g., predicted frames (P-frames) or bi-directional predicted frames (B-frames)). A user selects one of the non-key frames 120 to seek to. The user can select a particular frame by, for example, clicking a frame on a graphical timeline in a video player or editor, dragging or moving a cursor to a particular frame on the timeline, and incrementing or decrementing frames one-by-one (or by some other multiple of frames) using, e.g., arrow keys on a keyboard. It is to be appreciated that, although FIGS. 1A-1D show a video portion 100 having multiple key frames, the present technique can function with as few as one key frame, provided that the key frame is disposed before the selected non-key frame 120. This will generally be the case, as compressed videos will nearly always have a key frame as the first frame.

Figure 1B:
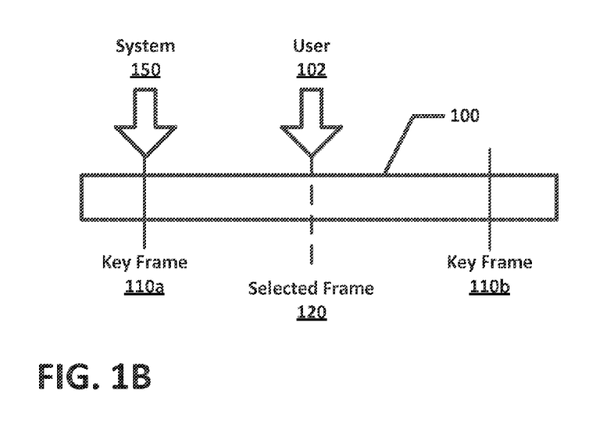

In FIG. 1B, the system 150 identifies a key frame 110a that is in temporal proximity to the selected frame 120; that is, a key frame that is close to the selected frame 120 in the video timeline. More specifically, the system 150 can identify the key frame 110a that is closest to and that temporally precedes the selected frame 120. Other key frames preceding the selected frame 120 can be used; however, as will be evident from the present disclosure, the process can be simplified by using the closest preceding key frame 110a.

Figure 1C:
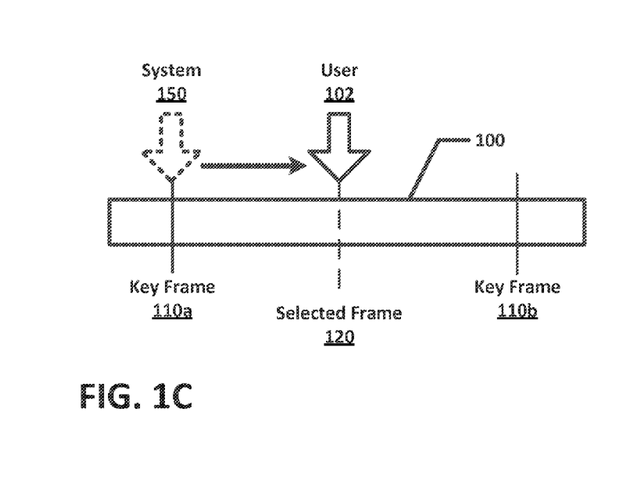
Figure 1D:
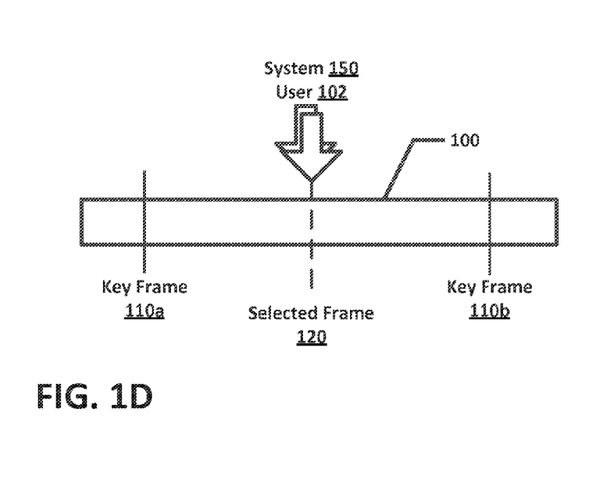

As shown in FIG. 1C, the system processes or plays one or more of the intermediate video frames between the key frame 110a and the selected frame 120 in a reduced time interval (i.e., in an amount of time less than the normal playback length of the intermediate video frames). In performing this step, the system decodes the compressed video frames and recreates the complete image that would be shown for the selected frame 120 during normal playback of the video. FIG. 1D shows that the system 150 displays the frame 120 selected by the user 102.

Figure 2:
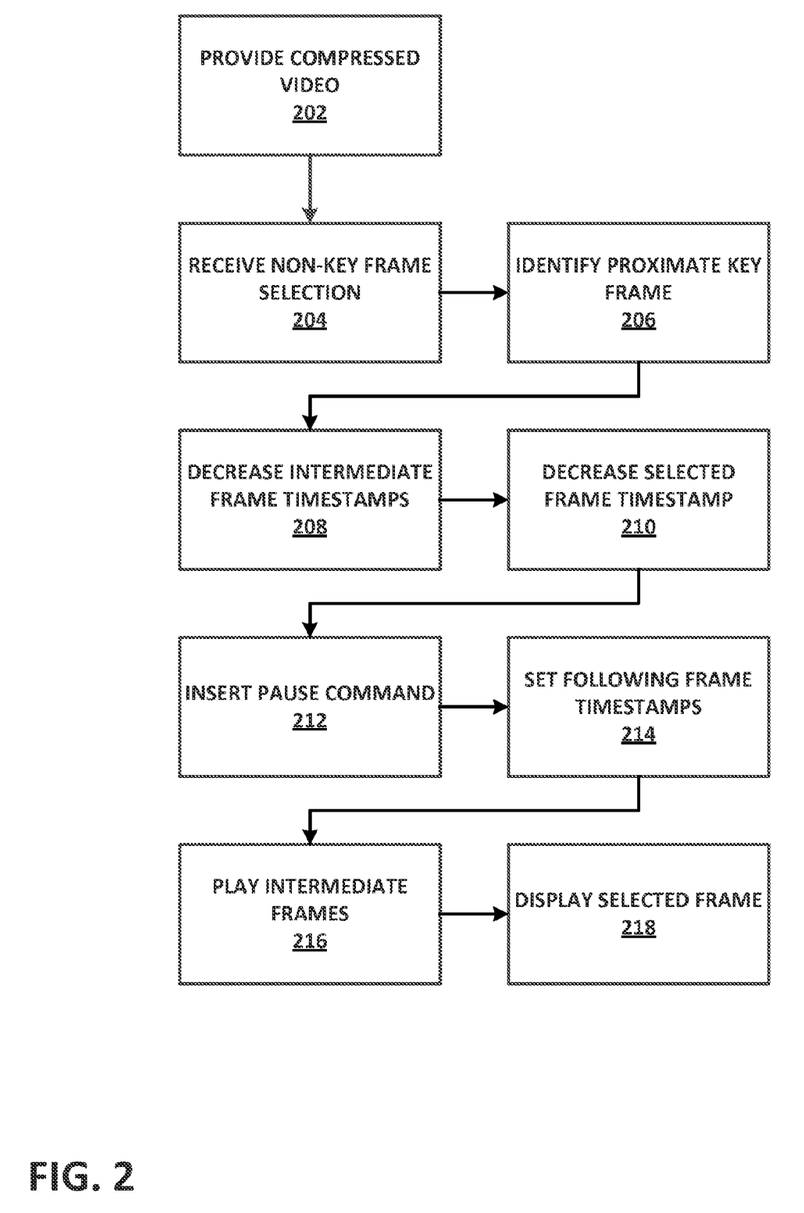
FIG. 2 is an example flowchart of a method for displaying a non-key frame.

FIG. 2 depicts an example method for displaying a non-key frame in a compressed video. In STEP 202, a compressed video is provided. The compressed video can have multiple frames, at least one of which is a key frame. Each frame has an associated playback timestamp that indicates when the frame is displayed during playback of the video. The timestamps can be absolute and/or relative (i.e., the time of playback of the frame is made with reference to another frame, such as a preceding key frame). A user can select a frame to seek to using, for example, the graphical timeline interface described above (STEP 204). Then, in STEP 206, the system identifies a key frame that is temporally proximate to the selected frame (e.g., the key frame that is nearest to and temporally precedes the selected frame on the video timeline).

STEPS 208, 210, 212, and 214 are steps that the system can take as part of or in preparation for playing a set of intermediate frames between the identified key frame and the selected key frame (STEP 216). For instance, in STEP 208, the playback timestamp for at least one of the frames in the set of intermediate frames can be decreased in order to reduce the total playback time of the intermediate frames. In one implementation, one or more of the intermediate frame timestamps can be decreased to a value substantially equal to zero (e.g., zero or a value near zero, such as 1 ms, 2 ms, 5 ms, or other value that results in a substantial decrease in the playback time of the intermediate frames). If, for example, all of the intermediate frame timestamps are set substantially equal to zero, the seek time to reach the selected frame can be nearly instantaneous and thus virtually imperceptible to the user. Similarly, the timestamp value for the selected frame can be decreased or set substantially equal to zero (STEP 210).

In STEP 212, a pause or stop command is inserted into the video directly after the selected frame so that the video player or editor freezes the display on the desired frame. A "show video" command can also be inserted into the video with the pause/stop command, along with a corresponding "hide video" command at the identified starting key frame (e.g., directly before or after). Inserting the show/hide commands causes the video player or editor to not display other intermediate frames while seeking to the desired frame. The foregoing commands can be part of a scripting language in a video format supporting such commands, such as Flash video.

Further, the playback timestamp of one or more frames after the selected frame can be set to incremental values greater than the timestamp value of the selected frame (STEP 214). The incremental values can be significantly larger than the timestamp value of the selected frame in order to provide sufficient time for the video player or editor to pause/stop on the selected frame and display it. For example, if the selected frame timestamp value is zero, the following frame timestamp can be set to a value that results in, e.g., a 500 ms delay between the two frames. Other delays are possible, such as 100 ms, 200 ms, 400 ms, 1000 ms, and so on. The delay value can depend on the particular implementation of the present system, and can be based on the particular video format and/or decoding abilities of the video player/editor.

Figure 3A:
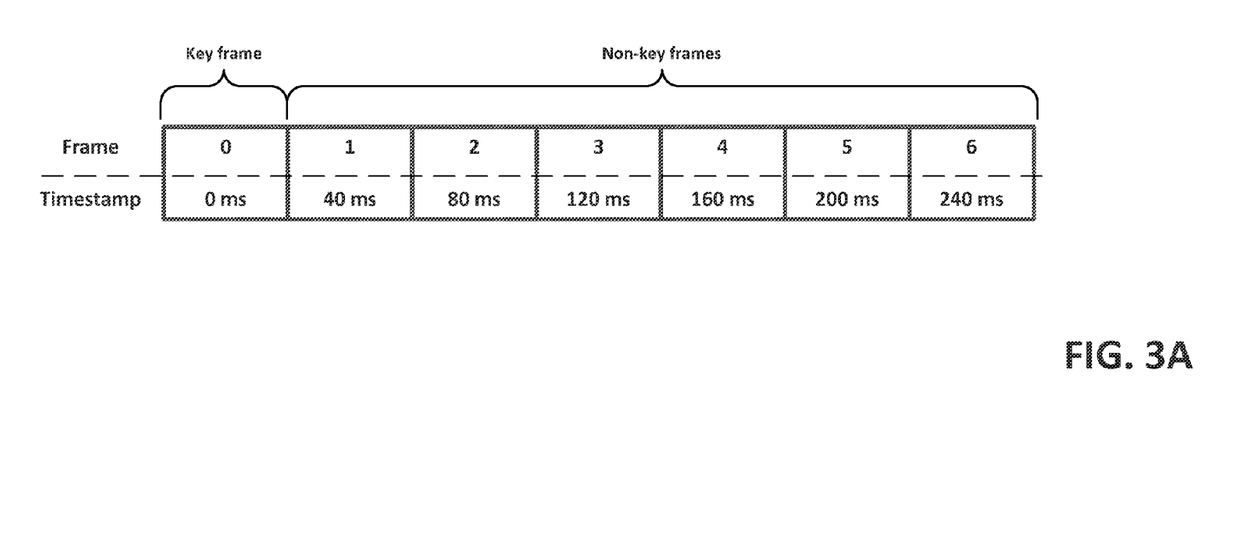
FIGS. 3A and 3B are example diagrams of timestamp manipulation for non-key frame seeking.

FIGS. 3A and 3B provide further detail on timestamp manipulation. FIG. 3A depicts a set of frames in a video, including a key frame (frame 0) and subsequent non-key frames (frames 1-6). In this example, the frame rate is 25 frames/sec (fps) and the time interval between frames is constant, resulting in the arrival of a frame every 40 ms. It should be noted, however, that other frame rates, constant or variable, are possible, such as 24 fps, 30 fps, 60 fps, and so on.

Figure 3B:
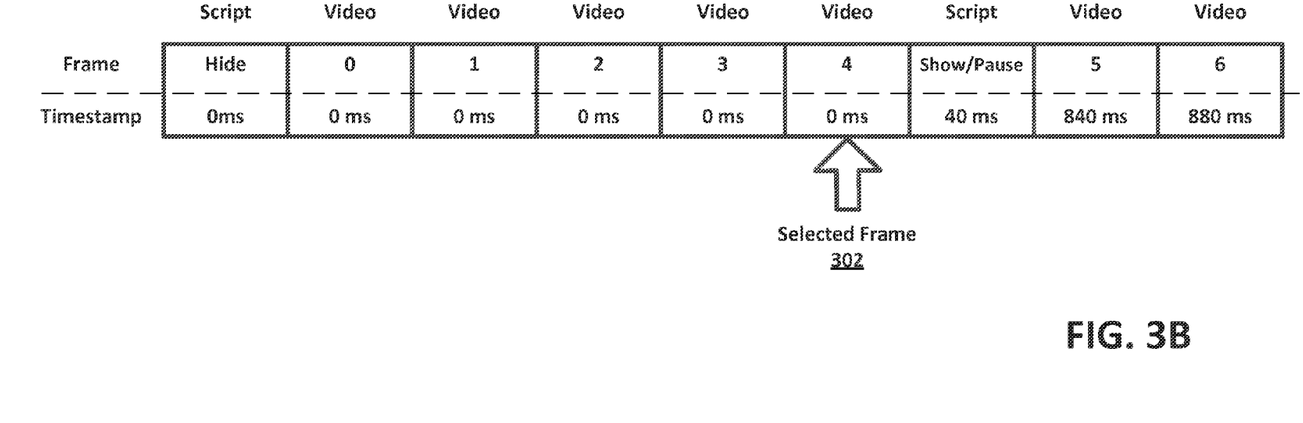

FIG. 3B shows the changes made to frame timestamps in order to seek to a selected frame 302. Here, the intermediate video frames between the key frame (frame 0) and the selected frame 302 (frame 4) have their timestamps set to zero. Moreover, the timestamp of the selected frame 302 is also set to zero. Thus, the video player or editor is instructed to play frames 0 to 4 nearly instantaneously, ultimately arriving at a constructed full image of the selected frame 302. Frames 5 and 6, which follow the selected frame 302 on the video timeline, are set to substantially larger timestamps, relative to the selected frame 302. In this case, frame 5 is set to 840 ms. Subsequent frames can bet set to increments of the frame rate; thus, the next frame (frame 6) is set to 880 ms (840+40 ms). The large delay (here, 840 ms) between frame 4 and frame 5 provides sufficient time for the video player/editor to pause and display the selected frame 302, and also because, in some cases, a frame can include changes from a following frame.

Also shown in FIG. 3B are scripting commands that can be inserted into the video timeline to facilitate control of the video playback. At the time when frame 0 is played (0 ms), or slightly before, a script block having a "hide video" command can be inserted, with a corresponding "show video" script command directly following the selected frame 302. The "hide video" command hides the video while the player/editor is playing frames 0 through 4 in a reduced time interval to reconstruct the complete image for the selected frame 302, and the "show video" command re-enables display of the video frames so that the complete image for the selected frame 302 is shown. Also directly following the selected frame 302 is a "pause" script command, so that the video freezes the display on the selected frame 302. In FIG. 3B, the "show video" and "pause" commands are added to the video timeline with a timestamp larger than the selected frame 302 to ensure that the command will be executed after the selected frame is recovered 302; however, the timestamp value can vary (e.g., same timestamp as selected frame, or larger, such as +10 ms, +40 ms, +100 ms, +500 ms, etc.) depending on the implementation (e.g., whether the video player/editor executes scripting commands before playing frames, how much time the player/editor needs to construct a frame before executing a command, and so on).

Referring back now to FIG. 2, after the frame timestamps have been manipulated, the intermediate frames are quickly played (STEP 216) to reconstruct the selected frame, which can then be played/displayed as a complete image (e.g., as if it were a key frame) (STEP 218).

One skilled in the art will appreciate how the present techniques can be applied to various types and formats of video of any resolution, including high-definition video. In some implementations, the systems and methods described herein can be used to seek to video frames that are constructed based on data from previous frames (e.g., P-frames), as well as video frames that are constructed based on data from previous and/or subsequent frames (e.g., B-frames). For example, if a selected frame for seeking is a B-frame, the system can play the intermediate frames between a preceding temporally proximate key frame and the selected frame in order to start reconstructing the full image of the selected frame (as described above); however, the system can also be configured to play one or more frames following the selected frame if such frames contain data needed to construct the image for the selected frame. In some implementations, the system can play frames that are temporally subsequent to the selected frame in reverse order in order to construct the image for the selected frame; e.g., the system can identify a subsequent temporally proximate key frame and play the intermediate frames between that key frame and the selected frame in reverse order on the timeline. This reverse-play technique can be used alone or in combination with the forward-play technique described herein to arrive at the fully constructed image for the selected frame, although this will depend on the video format and the compression algorithms used.

In an editing context, the video can be manipulated in conjunction with audio. For example, audio and design components (e.g., graphics, text, interface elements) can be added at any point in the video timeline because, generally, the playback/presentation of audio and design components is not a function of differences between preceding and/or subsequent audio or design data, as it is with compressed video. Thus, for example, an editor can seek to any video frame (key frame or non-key frame), and can edit an audio wave, add a design component to the video frame, trim audio/video, and so on, at the exact playback time of the frame.

A user can perform other functions using the non-key frame selection techniques described herein, such as capturing a video clip. In this case, the user can use a video player or editor to mark a start frame (which can be a non-key frame) and an end frame (which can be a non-key frame), and save the video between the start and end frames (inclusively) as a new video. The start frame, end frame, and/or other frames in the saved video can be converted into a key frame for the new video, e.g., by performing the steps described herein to form a complete image for a non-key frame.

The present techniques can also be used in conjunction with seamlessly assembled and selectably presentable multimedia content, such as that described in U.S. patent application Ser. No. 13/033,916, filed Feb. 24, 2011, and entitled "System and Method for Seamless Multimedia Assembly," and U.S. patent application Ser. No. 14/107,600, filed Dec. 16, 2013, and entitled "Methods and Systems for Unfolding Video Pre-roll," the entireties of which are incorporated by reference herein. The video described herein can include selectably presentable multimedia content which can have, for example, one or more predefined, separate multimedia content segments that are combined to create a continuous, seamless presentation such that there are no noticeable gaps, jumps, freezes, or other visual or audible interruptions to video or audio playback between segments. In addition to the foregoing, "seamless" can refer to a continuous playback of content that gives the user the appearance of watching a single, linear multimedia presentation, as well as a continuous playback of multiple content segments that have smooth audio and/or video transitions (e.g., fadeout/fade-in, linking segments) between two or more of the segments.

In some instances, the user is permitted to make choices or otherwise interact in real-time at decision points or during decision periods interspersed throughout the multimedia content. Decision points and/or decision periods can occur at any time and in any number during a multimedia segment, including at or near the beginning and/or the end of the segment. Decision points and/or periods can be predefined, occurring at fixed points or during fixed periods in the multimedia content segments. Based at least in part on the user's choices made before or during playback of content, one or more subsequent multimedia segment(s) associated with the choices can be presented to the user. In some implementations, the subsequent segment is played immediately and automatically following the conclusion of the current segment, whereas in other implementations, the subsequent segment is played immediately upon the user's interaction with the video, without waiting for the end of the decision period or the segment itself.

If a user does not make a selection at a decision point or during a decision period, a default or random selection can be made by the system. In some instances, the user is not provided with options; rather, the system automatically selects the segments that will be shown based on information that is associated with the user, other users, or other factors, such as the current date. For example, the system can automatically select subsequent segments based on the user's IP address, location, time zone, the weather in the user's location, social networking ID, saved selections, and so on. The system can also automatically select segments based on previous selections made by other users, such as the most popular suggestion or shared selections. The information can also be displayed to the user in the video, e.g., to show the user why an automatic selection is made. As one example, video segments can be automatically selected for presentation based on the geographical location of three different users: a user in Canada will see a twenty-second beer commercial segment followed by an interview segment with a Canadian citizen; a user in the US will see the same beer commercial segment followed by an interview segment with a US citizen; and a user in France is shown only the beer commercial segment.

Multimedia segment(s) selected automatically or by a user can be presented immediately following a currently playing segment, or can be shown after other segments are played. Further, the selected multimedia segment(s) can be presented to the user immediately after selection, after a fixed or random delay, at the end of a decision period, and/or at the end of the currently playing segment. Two or more combined segments form a seamless multimedia content path, and there can be multiple, different paths that a user can take to experience a complete, start-to-finish, seamless presentation. Further, one or more multimedia segments can be shared among intertwining paths while still ensuring a seamless transition from a previous segment and to the next segment. The content paths can be predefined, with fixed sets of possible transitions in order to ensure seamless transitions among segments. There can be any number of predefined paths, each having any number of predefined multimedia segments. Some or all of the segments can have the same or different playback lengths, including segments branching from a single source segment.

Traversal of the multimedia content along a content path can be performed by selecting among options that appear on and/or around the video while the video is playing. In some implementations, these options are presented to users at a decision point and/or during a decision period in a content segment. The display can hover and then disappear when the decision period ends or when an option has been selected. Further, a countdown or other visual, aural, or other sensory indicator can be presented during playback of content segment to inform the user of the point by which he must make his selection. For example, the countdown can indicate when the decision period will end, which can be at a different time than when the currently playing segment will end. If a decision period ends before the end of a particular segment, the remaining portion of the segment can serve as a non-interactive seamless transition to one or more other segments. Further, during this non-interactive end portion, the next multimedia content segment (and other potential next segments) can be downloaded and buffered in the background for later playback (or potential playback).

The segment that is played after a currently playing segment can be determined based on an option selected or other interaction with the video. Each available option can result in a different video and audio segment being played. As previously mentioned, the transition to the next segment can occur immediately upon selection, at the end of the current segment, or at some other predefined or random point. Notably, the transition between content segments can be seamless. In other words, the audio and video can continue playing regardless of whether a segment selection is made, and no noticeable gaps appear in audio or video playback between any connecting segments. In some instances, the video continues on to another segment after a certain amount of time if none is chosen, or can continue playing in a loop.

In one implementation, a user can select or seek to non-key frames in selectably presentable video segments by interacting with, e.g., a dynamic progress bar, such as that described in U.S. patent application Ser. No. 13/622,795, filed Sep. 19, 2012, and entitled "Progress Bar for Branched Videos," the entirety of which is incorporated by reference herein. For example, as the user is traversing one content path and viewing a particular video segment, he can jump to a specific frame in a specific video segment in the same content path or a parallel content path. In some instances, the user can use the progress bar to jump to the same location (e.g., same frame number or playback time) in a video segment in a parallel path. Using the methods described herein, the user can jump to any frame, including non-key frames, and still be presented with a complete image as if the frame were a key frame.

In one example, the multimedia content is a music video in which the user selects options upon reaching segment decision points to determine subsequent content to be played. First, a video introduction segment is played for the user. Prior to the end of the segment, a decision point is reached at which the user can select the next segment to be played from a listing of choices. In this case, the user is presented with a choice as to who will sing the first verse of the song: a tall, female performer, or a short, male performer. The user is given an amount of time to make a selection (i.e., a decision period), after which, if no selection is made, a default segment will be automatically selected. The default can be a predefined or random selection. Of note, the media content continues to play during the time the user is presented with the choices. Once a choice is selected (or the decision period ends), a seamless transition occurs to the next segment, meaning that the audio and video continue on to the next segment as if there were no break between the two segments and the user cannot visually or audibly detect the transition. As the music video continues, the user is presented with other choices at other decisions points, depending on which path of choices is followed. Ultimately, the user arrives at a final segment, having traversed a complete multimedia content path.

One skilled in the art will recognize the various forms in which the systems and methods described herein can be implemented. The functions provided by the video playback and editing systems described herein can be implemented in any appropriate hardware or software. If implemented as software, the invention can execute on a system capable of running a commercial operating system such as the Microsoft Windows® operating systems, the Apple OS X® operating systems, the Apple iOS® platform, the Google Android™ platform, the Linux® operating system and other variants of UNIX® operating systems, and the like.

Some or all of the described functionality can be implemented in a media player and/or other software downloaded to or existing on a user's device. Some of the functionality can exist remotely; for example, management functions can be performed on one or more remote servers. In some implementations, the user's device serves only to provide output and input functionality, with the remainder of the processes being performed remotely.

The local and/or remote software can be implemented on hardware such as a desktop computer, laptop, television, media device, set-top box, smartphone, tablet, smart or dumb terminal, network computer, personal digital assistant, wireless device, gaming device, music player, mobile telephone, palmtop, wireless telephone, information appliance, workstation, minicomputer, mainframe computer, or other computing device, that is operated as a general purpose computer or a special purpose hardware device that can execute the functionality described herein. The software can be implemented on a general purpose computing device in the form of a computer including a processing unit, a system memory, and a system bus that couples various system components including the system memory to the processing unit.

The described systems can include a plurality of software processing modules stored in a memory and executed on a processor in the manner described herein. The program modules can be in the form of any or more suitable programming languages, which are converted to machine language or object code to allow the processor or processors to read the instructions. The software can be in the form of a standalone application, implemented in any suitable programming language or framework.

Method steps of the techniques described herein can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit). Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. One or more memories can store media assets (e.g., audio, video, graphics, interface elements, and/or other media files), configuration files, and/or instructions that, when executed by a processor, form the modules, engines, and other components described herein and perform the functionality associated with the components. The processor and the memory can be supplemented by, or incorporated in special purpose logic circuitry.

In various implementations, the devices include a web browser, client software, or both. The web browser allows the client to request a web page or other downloadable program, applet, or document (e.g., from the server(s)) with a web page request. One example of a web page is a data file that includes computer executable or interpretable information, graphics, sound, text, and/or video, that can be displayed, executed, played, processed, streamed, and/or stored and that can contain links, or pointers, to other web pages. In one implementation, a user of the client manually requests a web page from the server. Alternatively, the device automatically makes requests with the web browser. Examples of commercially available web browser software are Microsoft® Internet Explorer®, Mozilla® Firefox®, and Apple® Safari®.

In some implementations, the devices include client software. The client software provides functionality to the device that provides for the implementation and execution of the features described herein. The client software can be implemented in various forms, for example, it can be in the form of a web page, widget, and/or Java, JavaScript, .Net, Silverlight, Flash, and/or other applet or plug-in that is downloaded to the device and runs in conjunction with the web browser. The client software and the web browser can be part of a single client-server interface; for example, the client software can be implemented as a "plug-in" to the web browser or to another framework or operating system. Any other suitable client software architecture, including but not limited to widget frameworks and applet technology can also be employed with the client software.

A communications network can connect the devices with one or more servers and/or with each other. The communication can take place via any media such as standard telephone lines, LAN or WAN links (e.g., T1, T3, 56 kb, X.25), broadband connections (ISDN, Frame Relay, ATM), wireless links (802.11, Bluetooth, GSM, CDMA, etc.), and so on. The network can carry TCP/IP protocol communications, and HTTP/HTTPS requests made by a web browser, and the connection between the clients and servers can be communicated over such TCP/IP networks. The type of network is not a limitation, however, and any suitable network can be used.

It should also be noted that implementations of the present invention can be provided as one or more computer-readable programs embodied on or in one or more articles of manufacture. The article of manufacture can be any suitable hardware apparatus, such as, for example, a floppy disk, a hard disk, a CD-ROM, a CD-RW, a CD-R, a DVD-ROM, a DVD-RW, a DVD-R, a flash memory card, a PROM, a RAM, a ROM, or a magnetic tape. In general, the computer-readable programs can be implemented in any programming language. The software programs can be further translated into machine language or virtual machine instructions and stored in a program file in that form. The program file can then be stored on or in one or more of the articles of manufacture.

Certain implementations of the present invention were described above. It is, however, expressly noted that the present invention is not limited to those implementations, but rather the intention is that additions and modifications to what was expressly described herein are also included within the scope of the invention. Moreover, it is to be understood that the features of the various implementations described herein were not mutually exclusive and can exist in various combinations and permutations, even if such combinations or permutations were not made express herein, without departing from the spirit and scope of the invention. In fact, variations, modifications, and other implementations of what was described herein will occur to those of ordinary skill in the art without departing from the spirit and the scope of the invention. As such, the invention is not to be defined only by the preceding illustrative description.

What is claimed is:
1. A computer-implemented method comprising:
receiving a selection of a frame in a compressed video that is not a key frame, the compressed video comprising a plurality of frames, each frame comprising a playback timestamp, at least one of the frames comprising a key frame;
identifying a key frame in the compressed video that is temporally proximate to the selected frame;

playing a set of frames comprising all of the frames between the identified key frame and the selected frame, wherein the playing of the set of frames is performed in a reduced time interval relative to a normal playback time interval of the set of frames; and displaying the selected frame as if it were a key frame.

2. The method of claim 1, wherein identifying a key frame in the compressed video that is temporally proximate to the selected frame comprises identifying a key frame that is nearest to and temporally precedes the selected frame.

3. The method of claim 1, wherein playing the set of frames comprises, for at least one of the frames in the set, decreasing a value of the playback timestamp of that frame.

4. The method of claim 3, wherein decreasing the value comprises setting the value substantially equal to zero.

5. The method of claim 3, further comprising setting a value of the playback timestamp of each frame in the set of frames substantially equal to zero.

6. The method of claim 5, further comprising decreasing a value of the playback timestamp of the selected frame.

7. The method of claim 6, wherein decreasing the value of the playback timestamp of the selected frame comprises setting the value of the playback timestamp of the selected frame substantially equal to zero.

8. The method of claim 6, further comprising setting the playback timestamp of at least one of the frames following the selected frame to a value greater than the playback timestamp of the selected frame.

9. The method of claim 1, wherein displaying the selected frame as if it were a key frame comprises displaying the selected frame as a complete image.

10. The method of claim 1, further comprising inserting, after the selected frame, a command to pause the video.

11. A system comprising:
one or more computers programmed to perform operations comprising:
receiving a selection of a frame in a compressed video that is not a key frame, the compressed video comprising a plurality of frames, each frame comprising a playback timestamp, at least one of the frames comprising a key frame;
identifying a key frame in the compressed video that is temporally proximate to the selected frame;
playing a set of frames comprising all of the frames between the identified key frame and the selected frame, wherein the playing of the set of frames is performed in a reduced time interval relative to a normal playback time interval of the set of frames; and
displaying the selected frame as if it were a key frame.

12. The system of claim 11, wherein identifying a key frame in the compressed video that is temporally proximate to the selected frame comprises identifying a key frame that is nearest to and temporally precedes the selected frame.

13. The system of claim 11, wherein playing the set of frames comprises, for at least one of the frames in the set, decreasing a value of the playback timestamp of that frame.

14. The system of claim 13, wherein decreasing the value comprises setting the value substantially equal to zero.

15. The system of claim 13, wherein the operations further comprise setting a value of the playback timestamp of each frame in the set of frames substantially equal to zero.

16. The system of claim 15, wherein the operations further comprise decreasing a value of the playback timestamp of the selected frame.

17. The system of claim 16, wherein decreasing the value of the playback timestamp of the selected frame comprises setting the value of the playback timestamp of the selected frame substantially equal to zero.

18. The system of claim 16, wherein the operations further comprise setting the playback timestamp of at least one of the frames following the selected frame to a value greater than the playback timestamp of the selected frame.

19. The system of claim 11, wherein displaying the selected frame as if it were a key frame comprises displaying the selected frame as a complete image.

20. The system of claim 11, wherein the operations further comprise inserting, after the selected frame, a command to pause the video.

* * * * *